United States Patent [19]
Garcia

[11] Patent Number: 6,048,149
[45] Date of Patent: Apr. 11, 2000

[54] FASTENING ANCHORAGE ASSEMBLY

[76] Inventor: Enrique Garcia, 355 W. 50 St., Hialeah, Fla. 33012

[21] Appl. No.: 09/245,465

[22] Filed: Feb. 5, 1999

[51] Int. Cl.[7] ...................................................... F16B 13/06
[52] U.S. Cl. .................................. 411/55; 411/48; 411/69
[58] Field of Search ................................. 411/34, 38, 45, 411/46, 48, 55, 69

[56] References Cited

U.S. PATENT DOCUMENTS

| | | | |
|---|---|---|---|
| 1,695,303 | 12/1928 | Tomkinson | 411/34 |
| 4,978,264 | 12/1990 | Philippe | 411/55 X |

FOREIGN PATENT DOCUMENTS

| | | | |
|---|---|---|---|
| 2536137 | 2/1977 | Germany | 411/55 |
| 195369 | 7/1923 | United Kingdom | 411/55 |
| 2022756 | 12/1979 | United Kingdom | 411/55 |

*Primary Examiner*—Neill Wilson
*Attorney, Agent, or Firm*—J. Sanchelima

[57] ABSTRACT

A fastening assembly for securing objects to a masonry body, such as shutter assemblies used to secure building windows, that includes a screw member, an anchorage assembly, an insert assembly partially housed within the anchorage assembly and a bushing ring coaxially journaling the screw member adjacent to the head. Thick grease is packed with the bushing ring to seal the internal components from the elements. The bushing ring has an internal through opening with two internal diameters. One of them, adjacent to the screw head being slightly larger than the shank of the screw in order to seal the rest of the components from the elements. The other end of the internal through opening being larger so that a portion of the insert member can penetrate therein when the assembly is tightened.

5 Claims, 1 Drawing Sheet

FASTENING ANCHORAGE ASSEMBLY

BACKGROUND OF THE INVENTION

1. Field of the Invention

The present invention relates to a system for fastening anchorage assembly that ensure effectivity and quality during the installation while the user can saving time.

2. Description of the Related Art

There are several fastening assembly designs in the prior art but none of them provides the locking mechanism improvements claimed herein. The closest reference is a fastening assembly conventionally used to secure shutters for building openings. The prior art is shown in the drawings. However, the prior art device requires precision in guiding the screw through the center. If this is not achieved, the integrity of the fastening assembly is degraded and becomes loose in time. The present invention ensures that the screw is guided through the center with the bushing ring member that is provided. Additionally, a peripheral slot around the insert member permits a stronger engagement with the deformable anchorage member. Finally, the bushing ring member also acts as a seal to prevent/retard the action of the elements on the internal parts of the assembly. A lubricant is added to improve this sealing action. These improvements materially enhance the fastening capability of the resulting assembly.

SUMMARY OF THE INVENTION

It is one of the main objects of the present invention to provide a reliable fastening anchorage assembly.

It is another object of this invention to provide a fastening assembly that insulates most of the fastening members from the elements.

It is another object of this invention to provide a fastening assembly that securely locks itself to the body where it is being installed.

It is still another object of the present invention to provide a fastening assembly that ensures that the fastening member (screw) is directed perpendicularly to the surface where it is being mounted.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
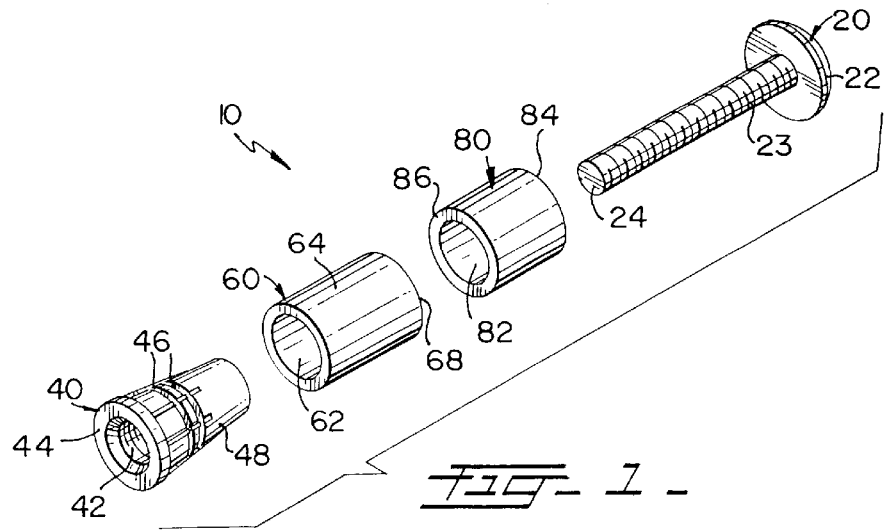
FIG. 1 is an isometric of one of the preferred embodiments for the fastening assembly subject of the present application.

Referring now to the drawings, where the present invention is a fastening assembly generally referred to with numeral 10, it can be observed in FIG. 1 that it basically includes an elongated fastening member or screw 20 that is compatible with frustroconical insert member 40 that includes an internal thread 42. Insert member 40 is partially housed within anchorage member 60, which is adjacent to and coaxially disposed to bushing ring 80. Screw 20 passes through bushing ring 80, anchorage member 60, and engaged to internal thread 42. All of these members being coaxially aligned.

Figure 2:
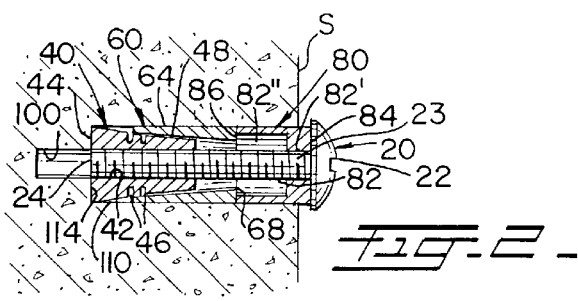
FIG. 2 shows a cross-sectional view of the assembly shown in the previous figure substantially housed within a bore and counter bore drilled in a body, such as a concrete blocks.
Figure 5:
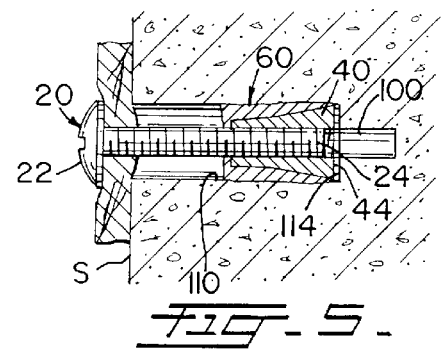
FIG. 5 shows the assembly shown in the previous figure showing a common problem found with the prior art assembly.

To use, a user drills a bore 100 and counterbore 110 in a masonry structure and inserts anchorage assembly 10 therein with insert member 40 partially housed within anchorage member 60. End 44 of insert member 40 is brought against innermost end 114 of counterbore 110 with distal end 24 of screw member 20 still housed within insert member 40, as seen in FIG. 2.

Figure 3:
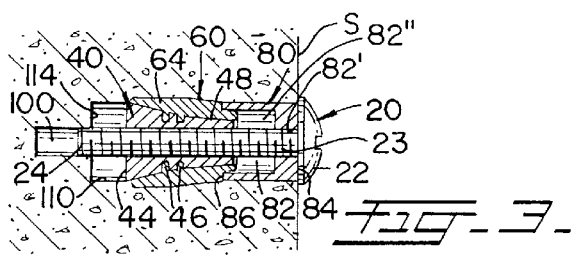
FIG. 3 illustrates the assembly shown in the previous figure after the screw member is advanced into the frustroconical insert.
Figure 6:
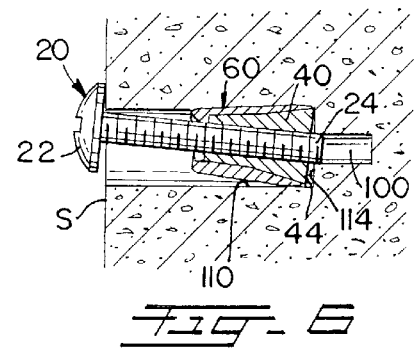
FIG. 6 shows the assembly as shown in the previous figure showing a common problem found in the prior art with the bolt off-center in the bore.
Figure 4:
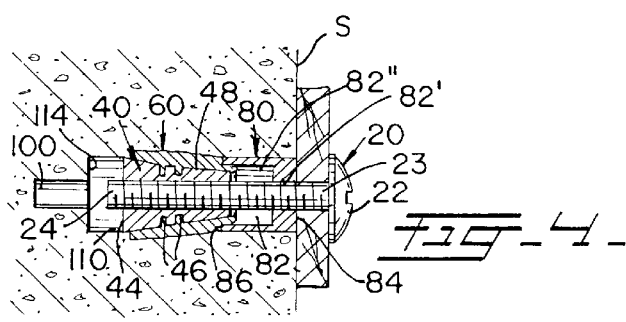
FIG. 4 is a cross-sectional representation of the anchorage assembly.

Insert member 40 has a frustroconical shape with peripheral slots 46 around outer surface 48. As shown in FIG. 3, when screw member 20 is advanced through internal thread 42, the latter is urged outwardly and into narrowing frustroconical central opening 62 forcing outer surface 64 against a portion of the concrete surface that defines counterbore 110 thus enhancing the fictional engagement of member 60 to counterbore 110, as best seen in FIG. 3. Member 60 is made out of a deformable material, such as lead. Also, as insert member 40 advances inside member 60, material from the latter is lodged inside peripheral slots 46, enhancing the engagement between members 40 and 60.

Ring member 80 is made out of relatively hard material, such as bronze or steel, and it includes a central opening 82 with diameter larger on one end 84 (the outer end) than the other end 86 (inner). Head 22 of screw member 20, when driven in, comes in abutting reaction with outer end 84 of ring 80. As seen en FIG. 3, ring member 80 advances inwardly until end 84 is flush with surface S. Inner end 86 of ring member 80 comes in abutting contact with outer end 68. The small diameter portion 82' of central opening 82 has a cooperative dimension to permit shank 23 of screw member 20 to go through and more important, guide screw member 20 perpendicularly with respect to surface S and coaxially through bore 100. Also, a lubricant is applied to the shaft of screw member 20 that in conjunction with ring member 80, substantially seals the internal part of assembly 10 preventing exposure to the elements and/or retarding its effect.

Large diameter portion 82" of opening 82 permits a partial intrusion of insert member 40 when screw member 20 is advanced. Small diameter 82' portion is intended to keep to a minimum the space between shank 23 and the internal surface of member 80 at portion 82'. With the help of a suitable lubricant, effective protection against the elements is provided.

As it can be seen in FIG. 3, when screw member 20 is advanced, insert member 40 comes within deformable anchorage member 60 forcing its outer walls radically outward thus increasing the frictional retention of member 60 to the solid body where it is mounted. Furthermore, the inner walls defining central opening 62 are bitten by peripheral slots 46 as insert member 40 forcefully advances inwardly and even partially penetrates inside bushing ring member 80.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fastening assembly for installation in a solid body, comprising:
   A) an elongated screw member having a threaded shank with first and second ends, and a head on said first end;
   B) a bushing ring member having a through opening through which said screw coaxially and slidably disposed and a portion of said screw member being covered by said bushing ring member, and said bushing ring member having third and fourth ends with said third end being adjacent to said head and said bushing ring member having a longitudinal distance that is sufficient to coaxially guide said screw member;
   C) a frustroconical insert member having an outer surface, fifth and sixth ends and an internal thread compatible with said threaded shank, said fifth end having a smaller outer diameter than said sixth end wherein said frustroconical insert members includes at least one slot on said outer surface so that when said deformable anchorage assembly is deformed part of it is lodged in said slot thereby enhancing the engagement of said insert member and said deformable anchorage assembly; and
   D) a deformable anchorage assembly having a cylindrical shape said anchorage assembly being mounted within a cooperative bore in a solid body and further including a narrowing central opening with seventh and eighth ends and said seventh end having the smaller internal diameter of said narrowing central opening to snugly receive said fifth end of said insert member so that said insert member is urged within said anchorage assembly penetrating through said seventh end when said screw member advances within the internal thread of said insert member.

2. The fastening assembly set forth in claim 1 wherein said slot extends peripherally around said outer surface.

3. The fastening assembly set forth in claim 2 further including:
   E) a lubricant applied to said threaded shank and said bushing ring member thereby sealing said portion of said screw covered by said bushing ring member.

4. The fastening assembly set forth in claim 3 wherein said through opening has a smaller diameter on a section adjacent to said third end that the diameter of section adjacent to said fourth end.

5. The fastening assembly set forth in claim 4 wherein the internal diameter of said through opening adjacent to said third end cooperates to snugly and slidably permit said shank through, and the internal diameter of the balance of said through opening being cooperatively larger to permit said fifth end to partially penetrate through said fourth end when said screw member is advanced within said insert member.

* * * * *